Dec. 5, 1961 E. J. JAGGER 3,012,155

THREE STATE MEMORY DEVICE

Filed July 27, 1959 2 Sheets-Sheet 1

INVENTOR,
EDGAR J. JAGGER
BY Robert W. Hines
ATTORNEY

THREE STATE MEMORY DEVICE

Filed July 27, 1959 2 Sheets-Sheet 2

INVENTOR,
EDGAR J. JAGGER

BY Robert W. Himes
ATTORNEY

United States Patent Office 3,012,155
Patented Dec. 5, 1961

3,012,155

THREE STATE MEMORY DEVICE

Edgar J. Jagger, West Covina, Calif., assignor to Hughes Aircraft Company, Culver City, Calif., a corporation of Delaware Filed July 27, 1959, Ser. No. 829,826
6 Claims. (Cl. 307—88.5)

This invention relates to a three state digital computer memory element hereafter designated as a "flip-flop-flap" and, more particularly, to a digital computer apparatus adapted to selectively provide information level signals at an output terminal in response to an information level signal applied to a corresponding input terminal.

In the mechanization of apparatus for performing various computational problems, it is sometimes more expeditious to employ a tertiary system of numbers. The present three state memory device is especially adapted for employment in apparatus of this type.

It is an object of the present invention to provide a digital computer apparatus capable of providing three state memory of bi-level signals appearing on three input leads.

Another object of the present invention is to provide a three state digital computer memory device employing a minimum number of electronic components.

Still another object of the present invention is to provide a three state memory device capable of producing principal output signals together with the respective complements thereof without employing additional inverting elements.

A further object of the present invention is to provide an $n$-input, $n$-state memory device capable of providing $2n$ principal and complementary output signals.

In accordance with the present invention, the three state memory device is implemented by three two-input "inverter-or" or "nor" gate circuits, one input terminal of each "nor" gate constituting the three input terminals of the device. The remaining input of each "nor" gate is responsive to the output of respective two-input "and" gates, the inputs of which are, in turn, responsive to the output terminals of the two remaining "nor" gates.

In operation, the disclosed memory device can be set to any of its three states by applying an information level signal to the corresponding input terminal. The absence of an input on all of the three input terminals leaves the state of the device unchanged and the appearance of an information level signal on any of the three input leads causes an information level signal either to shift to or to appear on the corresponding output terminal irrespective of the initial state of the device. For a reliable change of state, it is essential that no more than one input signal be at the information level at one time. If desired, this requirement can be met by proper logical implementation and, hence, it is not considered serious.

The above-mentioned and other features and objects of this invention and the manner of obtaining them will become more apparent by reference to the following description taken in conjunction with the accompanying drawing, wherein.

Figure 2:
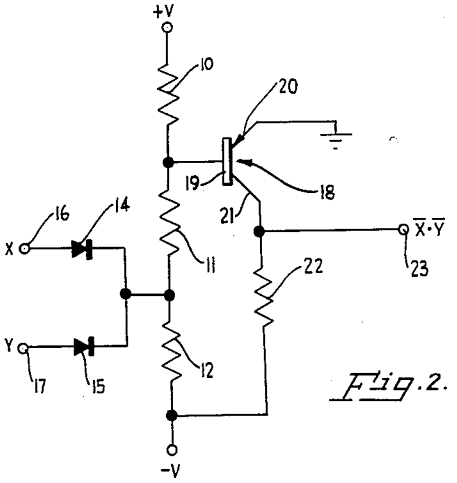
FIG. 2 is a schematic circuit diagram of an inverter-or ("nor") gate.

Prior to describing the three state memory device of the present invention, some of the more basic elements thereof together with their operation will be described. Referring to FIG. 2, there is shown a schematic circuit diagram of an "inverter-or" or "nor" gate. This gate comprises serially connected resistors 10, 11 and 12. A source of potential (not shown) is applied across this series circuit in a manner to maintain the extremities thereof at +V and −V volts relative to ground, as shown in the drawing. The voltage, V, may be of the order of 20 volts. In addition, diodes 14, 15 are connected, respectively, from input terminals 16, 17 to the common junction between resistors 11 and 12. Both diodes 14 and 15 are poled to allow current flow from the input terminals 16 or 17 to the common junction. Lastly, a transistor 18 has a base 19 connected to the junction between resistors 10 and 11, an emitter 20 connected to ground, and a collector 21 connected through a load resistor 22 to the source of negative potential maintained at −V volts and also to an output terminal 23. In operation, bi-level signals X and Y are applied to input terminals 16, 17, respectively. In the instant and subsequent description, the complement or negation of a bi-level signal is designated as a signal which is always at the level opposite from that of the principal signal. The complement will be designated by a straight horizontal line drawn over the principal signal. Thus, $\overline{X}$ and $\overline{Y}$ are the complements of the signals X and Y, respectively. In the present circuit, an information level signal appears at the output terminal 23 only when the logical product of the complements of both the input signals is at the information level. Thus, the signal appearing at terminal 23 may be represented in logical form as $\overline{X}\cdot\overline{Y}$.

Figure 1:
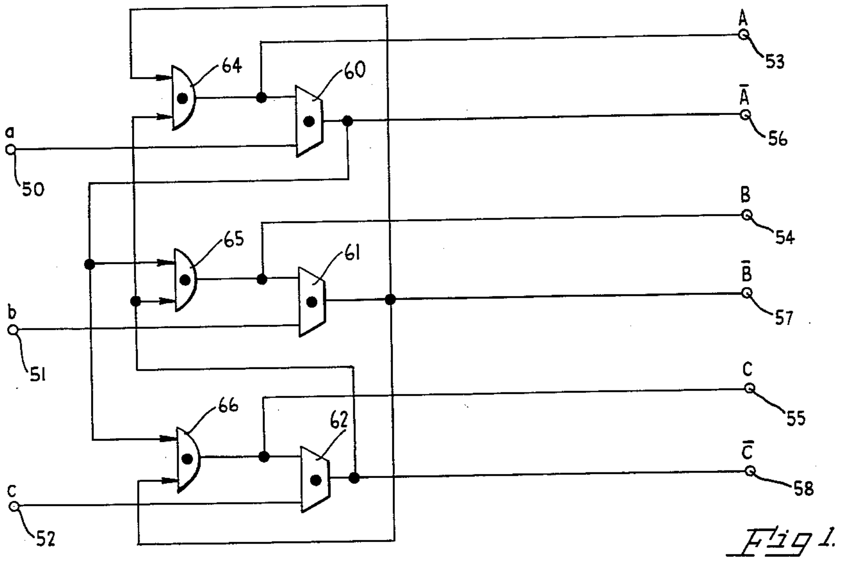
FIG. 1 is a schematic diagram of the three state memory device of the present invention.
Figure 3:
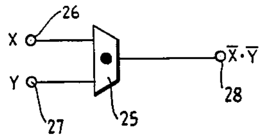
FIG. 3 is a symbolic representation of the "nor" gate of FIG. 2 as employed in the circuit diagram of FIG. 1.

Referring now to FIG. 3, a convention is employed in the schematic block diagram of FIG. 1 wherein an individual "nor" gate is shown as an isosceles trapezoid 25 with input terminals 26, 27 appearing on the longer side thereof and an output terminal 28 appearing on the shorter side. A "nor" gate is indicated by a dot (·) disposed within the respective trapezoidal block. As specified above, a "nor" gate produces a signal representative of the conjunction of the negations or complements of the input signals. Thus, as before, bi-level input signals X, Y applied to input terminals 26, 27, respectively, produce a signal which may be represented in logical form as $\overline{X}\cdot\overline{Y}$ at the output terminal 28. This signal will be at the one or information level only when both input signals X and Y are at the zero level.

Figure 4:
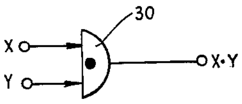
FIG. 4 is a symbolic representation of an "and" gate as employed in the circuit diagram of FIG. 1.

Referring to FIG. 4, there is illustrated an additional convention which is employed in describing the apparatus of FIG. 1 wherein an individual "and" gate is shown as a semicircular block 30 with inputs applied to the straight side thereof and an output appearing on the semicircular side. In this instance, an "and" gate is also indicated by a dot (·) disposed within the semicircular block 30. As is generally known, an "and" gate produces a one or information level output signal only when every input signal applied to the input terminals thereof is at the information level. That is, the output signal is the "conjunction" of the input signals. Thus, bi-level input signals, X, Y, applied to the input terminals of the "and" gate of FIG. 4 produce a signal which may be represented in logical form as $X\cdot Y$ at the output terminal thereof.

Referring now to FIG. 1, there is illustrated a schematic diagram of the three state memory apparatus of the present invention. This apparatus possesses input terminals 50, 51 and 52; corresponding principal output terminals 53, 54 and 55; and complementary output terminals 56, 57 and 58, respectively. Each of the input terminals 50, 51 and 52 are connected, respectively, to one of the inputs of three two-input terminal "nor" gates 60, 61 and 62, the outputs of which are connected, respectively, to the complementary output terminals 56, 57 and 58. Further, three two-input terminal "and" gates 64, 65 and 66 have outputs which are each connected, respectively, to the remaining input terminal of each of the "nor" gates 60, 61 and 62. The respective two input terminals of each "and" gate are connected to the output terminals of the other two "nor" gates. That is, "and" gate 64 has an output connected to one of the inputs of "nor" gate 60 and has inputs responsive to the outputs of "nor" gate 61 and "nor" gate 62; "and" gate 65 has an output connected to one of the inputs of "nor" gate 61 and has inputs responsive to the outputs of "nor" gates 60 and 62; and "and" gate 66 has an output connected to one of the inputs of "nor" gate 62 and has inputs connected to the outputs of "nor" gates 60, 61.

Figure 5:
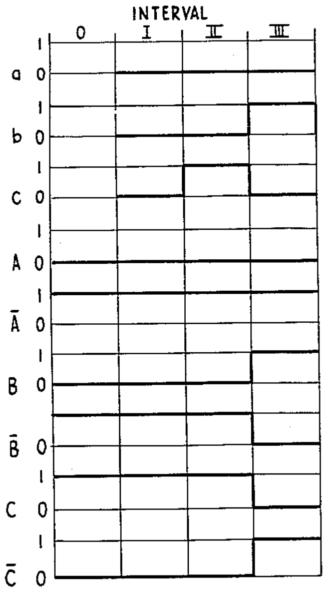
FIG. 5 illustrates waveforms of input signals and corresponding output signals in the operation of the apparatus of FIG. 1.

In the operation of the three state memory device of the present invention, it will first be assumed that signals *a, b, c* are applied to the three input terminals 50, 51, 52 and that these signals are all at the zero level during an interval I (see FIG. 5) under consideration. In addition, it is assumed that signal C appearing at terminal 55 is initially at the one or information level. Under these circumstances, a zero level signal will be applied to each of the lower input connections, as shown in the drawing, of each of the "nor" gates 60, 61, 62. Also, according to the initial assumption, the output signals from "nor" gates 60 and 61 which constitute signals $\overline{A}$ and $\overline{B}$ will initially be at the information level and the output signal from "nor" gate 62 appearing at terminal 58 which constitutes signal $\overline{C}$ will initially be at the zero level. This latter output is applied to an input of each of the "and" gates 64, 65, whereby zero level signals are produced at the respective outputs thereof and applied to the remaining input of each of the "nor" gates 60, 61. In that the outputs of the "and" gates 64, 65 are each connected, respectively, to the principal output terminals 53, 54, it is apparent that a zero level signal continues on these terminals during interval I. Also, since both of the inputs applied to each of the "nor" gates 60, 61 are at the zero level, the signals generated at the outputs thereof continue at the information level as initially assumed. These signals appear at the complementary output terminals 56, 57, whereby $\overline{A}$ and $\overline{B}$ both remain at the information level during interval I.

In addition to the foregoing, both of the information level signals appearing at the outputs of the "nor" gates 60, 61 are applied to the input terminals of the "and" gate 66 to produce an information signal at the output thereof which is applied to the remaining input of the "nor" gate 62 to the principal output terminal 55 on which signal C appears. Thus, signal C appearing on terminal 55 remains at the information level during the present interval I under consideration. Also, in that the information level signal generated at the output of "and" gate 66 is applied to the remaining input of the "nor" gate 62, it is evident that the signal generated at the output thereof will continue at the zero level. This zero level signal is applied to the output terminal 58 and constitutes the signal $\overline{C}$. Thus, from the foregoing, it is evident that zero level signals *a, b* and *c* applied, respectively, to the input terminals 50, 51, 52 during interval I will not change the state of the signals initially appearing on the principal output terminals 53, 54, 55 or on the complementary output terminals 56, 57, 58. Hence, the device of the present invention provides memory during the interval I when all of the input signals *a, b, c* remain at the zero level.

During time interval II, the situation will be considered wherein the level of the output signals A, B, C commence at the same levels as at the termination interval I. That is, signals A and B are at the zero level and signal C is at the one or information level. Further, at the commencement of interval II, the input signal *c* is increased from the zero level to the one or information level. Referring to FIG. 1, it is evident that this change in the level of input signal *c* will have no effect upon the levels of the output signals. This is because signals $\overline{A}$ and $\overline{B}$ are applied through "and" gate 66 to an input of the "nor" gate 62. Inasmuch as the signal at the output of "and" gate 66 is at the information level, the signal generated at the output of "nor" gate 62 is at the zero level. Consequently, raising the level of input signal *c* to the information level has no effect on the level of the output signal generated by "nor" gate 62. Inasmuch as this is the only input to where input signal *c* is applied, it is apparent that raising the level of input signal *c* will not affect any other portion of the circuit. Hence, the level of the output signals A, B and C generated at terminals 53, 54 and 55, respectively, will remain unchanged throughout interval II.

In the next interval III, the signals commence at the same level as at the termination of interval II. At the commencement of interval III, the input signal *b* increases to the one or information level and input signal *c* decreases to the zero level. As during interval II, a change in the level of input signal *c* from the information to the zero level at the input of "nor" gate 62 has no immediate effect upon the signal generated at the output thereof. "Nor" gate 62, however, is now in a state whereby a change in the level of the signal applied to the remaining input thereto will generate an information level signal a the output thereof. The change in the level of input signal *b* from the zero level to the information level, however, results in the signal $\overline{B}$ generated at the output of "nor" gate 61 and appearing at the terminal 57 in changing from the one level to the zero level. This zero level signal $\overline{B}$ is applied to inputs of both "and" gates 64 and 66 and, hence, results in zero level signals being applied to the remaining inputs of "nor" gates 60 and 62. Thus, output signals A, C appearing at terminals 53, 55 will be at zero level during interval III and output signal B appearing at terminal 54 will be at the information level. This behavior may be generalized by saying that the appearance of an information level signal at any of the input terminals 50, 51 or 52 will develop an information level output signal at the corresponding principal output terminal 53, 54 or 55 and a zero level signal at the remaining output terminals.

It is now evident that both signals applied to each respective pair of inputs of "nor" gates 60, 62 are at the zero level; hence, the signals $\overline{A}$, $\overline{C}$ appearing at output terminals 56, 58 will be at the information level during interval III. In addition, both of these signals $\overline{A}$, $\overline{C}$ are applied to "and" gate 65 to produce an information level signal which constitutes signal B at the remaining input of "nor" gate 61 and at output terminal 54. Also, in that input signal *b* which is applied to one input of "nor" gate 61 has already changed to the information level, this latter change in level of the signal applied to the remaining input of "nor" gate 61 will not change the level generated at the output thereof. Thus, an information level signal *b* applied to the input terminal 51 concurrently with the remaining input signals *a* and *c* applied to input terminals 50, 52, respectively, being at the zero level results in zero level output signals A and C being generated at terminals 53, 55 and a one or information level output signal B being generated at output terminal 54.

Because of the symmetry of the three state memory device of the present invention, it is evident that an information level signal applied to any one of the three input terminals 50, 51 or 52 will result in an information level output signal being generated at the corresponding output terminal irrespective of the prior level of the signals being stored. Also, it is evident that the input signals *a, b* and *c* may be applied to the input terminals 50, 51, 52 in conjunction with periodic clock pulses inasmuch as it is only necessary for an input signal to momentarily remain at the information level to generate a corresponding information level output signal which will remain until an information level input signal is applied to one of the two alternative input terminals.

Figure 6:
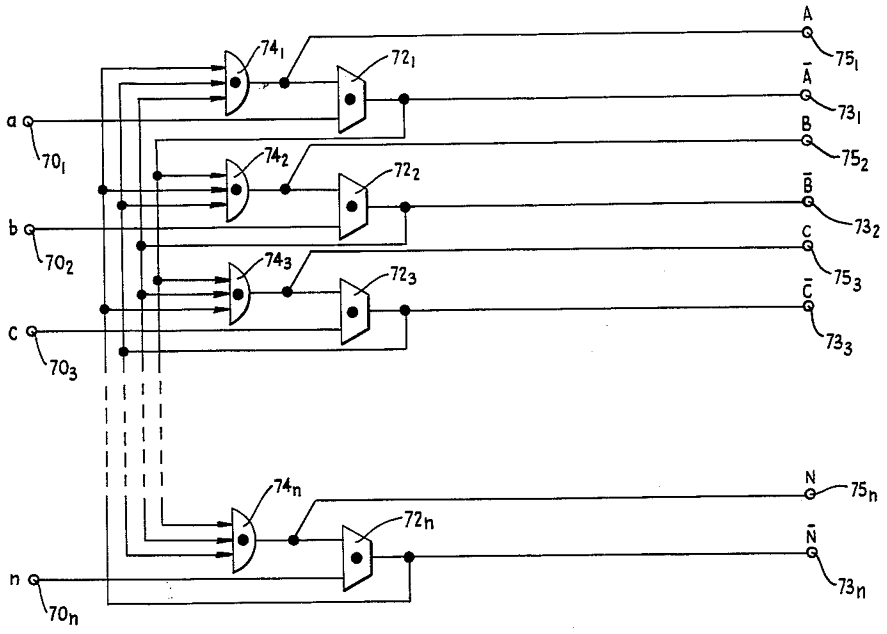
FIG. 6 illustrates a schematic diagram of an $n$-input, $n$-state memory device in accordance with the present invention.

It is evident from the teachings and description presented in connection with the apparatus of FIG. 1, that the present invention can be extended to a similar device having $n$-inputs, $n$-memory states, and $2n$-outputs, wherein $n$ is an integer equal to or greater than 3. In the case of the three state memory device of FIG. 1, $n$ is, of course, equal to 3. Referring to FIG. 6, there is illustrated an $n$-state memory device in accordance with the present invention. This device comprises $n$ input terminals $70_1$, $70_2$, $70_3$ . . . $70_n$ which are connected, respectively, to one input of $n$ 2-input "nor" gates $72_1$, $72_2$, $72_3$ . . . $72_n$. The outputs from these "nor" gates $72_1$ . . . $72_n$ are, in turn, connected to complementary output terminals $73_1$, $73_2$, $73_3$ . . . $73_n$. The remaining input of each of the "nor" gates $72_1$ . . . $72_n$ are each connected to the respective outputs of $n$ "and" gates $74_1$ . . . $74_n$, respectively, each of which has $(n-1)$ inputs. The respective inputs of each of the "and" gates $74_1$ . . . $74_n$ are, as before, connected to the outputs of the remaining "nor" gates. That is, a particular "and" gate $74_m$ has inputs connected to the outputs of "nor" gates $72_1$, $72_2$ . . . $72_{m-1}$, $72_{m+1}$ . . . $72_{n-1}$ and $72_n$, wherein $m$ is an integer that is equal to or greater than 2 and equal to or less than $n$. Lastly, the output of each "and" gate $74_1$ . . . $74_n$ is connected, respectively, to $n$ principal output terminals $75_1$ . . . $75_n$.

In operation, $n$ bi-level input signals $a, b, c$ . . . $n$ are applied, respectively, to input terminals $70_1$ . . . $70_n$. The principal output signals A, B, C . . . N appear, respectively, on principal output terminals $75_1$ . . . $75_n$ and the complementary output signals $\overline{A}, \overline{B}, \overline{C}$ . . . $\overline{N}$ appear, respectively, on complementary output terminals $73_1$ . . . $73_n$. The functioning of the apparatus is substantially the same as described in connection with that of FIG. 1 and so will not be repeated.

What is claimed is:

1. A computer apparatus for providing $n$-state memory for $n$ bi-level input signals wherein $n$ is an integer no less than three, said apparatus comprising first gating means having $n$ sets of input terminals and $n$ output terminals for producing $n$ output signals thereat, the output signal appearing at each $m$th output terminal being representative of the conjunction of the negations of the input signals applied to the $m$th set of input terminals, $m$ being an integer which is sequentially assigned values of from one to $n$; second gating means having $n$ sets of input terminals and $n$ corresponding output terminals, each $m$th set of input terminals being connected to the first, second . . . $(m-1)$, $(m+1)$ . . . $n$ output terminals of said first gating means for producing $n$ intermediate output signals each representative of the conjunction of the input signals applied to the corresponding set of input terminals; and means for simultaneously applying each of said $n$ bi-level input signals together with a corresponding intermediate output signal from said second gating means to each $m$th set of input terminals of said first gating means thereby to produce $n$ complementary output signals at the respective outputs of said first gating means.

2. The computer apparatus as defined in claim 1 wherein $n=3$.

3. A computer apparatus for providing $n$-state memory for $n$ bi-level input signals where $n$ is an interger no less than three, said apparatus comprising first, second, third . . . $n$ two-input "inverter-or" gates for producing first, second, third . . . $n$ output signals each representative of the conjunction of the negations of the two input signals applied to the respective "inverter-or" gate; first, second, third . . . $n$ "and" gates each having $(n-1)$ inputs and an output for producing first, second, third . . . $n$ intermediate output signals each representative of the conjunction of the input signals applied to the respective "and" gate; means connecting the ouputs from said first, second . . . $(m-1)$, $(m+1)$ . . . $n$ "inverter-or" gates to each $m$th "and" gate where $m$ is successively assigned values of from one to $n$; and means for simultaneously assigned values of from one to $n$; and means for simultaneously applying each of said $n$ bi-level input signals together with an intermediate output signal from said first, second, third . . . $n$th "and" gates to the respective inputs of the corresponding first, second, third . . . and $n$ "inverter-or" gates thereby to produce $n$ complementary output signals at the respective outputs thereof.

4. The computer apparatus as defined in claim 3 which additionally includes first, second, third . . . and $n$ output terminals connected, respectively, to the outputs of said first, second, third . . . $n$ "and" gates thereby to make available $n$ principal output signals.

5. A computer apparatus for providing three state memory for first, second and third bi-level input signals, said apparatus comprising first, second and third two-input "inverter-or" gates for producing first, second and third output signals each representative of the conjunction of the negations of the two-input signals applied thereto; first, second and third "and" gates each having two inputs and an output for producing first, second and third intermediate output signals each representative of the conjunction of the input signals applied thereto; means connecting the outputs from said first and second "inverter-or" gates to the inputs of said third "and" gate; means connecting the outputs from said first and third "inverter-or" gates to the inputs of said second "and" gate; means connecting the outputs of said second and third "inverter-or" gates to the inputs of said first "and" gate; means for applying said intermediate output signals of said first, second and third "and" gates, respectively, to an input of each of said first, second and third "inverter-or" gates; and means for applying said first, second and third bi-level input signals, respectively, to the remaining input of each of said first, second and third "inverter-or" gates, thereby to produce first, second and third complementary output signals at the respective outputs thereof.

6. The computer apparatus as defined in claim 5 which additionally includes, first, second and third output terminals connected, respectively, to the outputs of said first, second and third "and" gates thereby to make available first, second and third principal output signals.

References Cited in the file of this patent

UNITED STATES PATENTS 2,825,889 Henle ---------------- Mar. 4, 1958

OTHER REFERENCES

A Digital to Analogue Shaft Converter by Harry Margulius and Paul Coble, submitted for B.S. degree at MIT, June 1957, pp. 23, 47 and 49.